United States Patent [19]

Suzuki et al.

[11] 4,126,874

[45] Nov. 21, 1978

[54] POWER SUPPLY CIRCUIT FOR CAMERA

[75] Inventors: Ryoichi Suzuki, Kawasaki; Masanori Uchidoi, Yokohama; Yukio Mashimo, Tokyo; Tetsuya Taguchi, Kawasaki; Yusuke Ono, Tokyo; Hiroshi Aizawa, Machida, all of Japan

[73] Assignee: Canon Kabushiki Kaisha, Tokyo, Japan

[21] Appl. No.: 752,175

[22] Filed: Dec. 20, 1976

[30] Foreign Application Priority Data

Dec. 27, 1975 [JP] Japan .................................. 51-156680
Feb. 9, 1976 [JP] Japan .................................. 51-13077

[51] Int. Cl.² .......................... G03B 7/00; G01N 27/42
[52] U.S. Cl. .................................. 354/60 R; 320/48; 324/29.5; 340/636
[58] Field of Search ................. 354/60 R, 60 E, 60 L; 324/29.5; 340/249; 320/48

[56] References Cited

U.S. PATENT DOCUMENTS

| 3,699,857 | 10/1972 | Wagner et al. .................. 354/60 L |
| 3,947,855 | 3/1976 | Inoue et al. .................. 354/60 L X |
| 3,979,657 | 9/1976 | Yorksie .................. 340/249 X |

*Primary Examiner*—Michael L. Gellner
*Attorney, Agent, or Firm*—Toren, McGeady and Stanger

[57] ABSTRACT

A power supply circuit for a camera wherein a detection circuit which detects the voltage of a power source is provided for supplying an electric power to the electric circuit of the camera only when the detected voltage is above a preset value. In the power supply circuit, the power supply is controlled by a detection output obtained after a voltage detecting action is performed in a stable condition by the detection circuit. The power source voltage is detected in a manner suitable for the characteristic of the battery employed. Further, the voltage detection is performed only momentarily to prevent unnecessary power consumption for voltage detection.

12 Claims, 8 Drawing Figures

POWER SUPPLY CIRCUIT FOR CAMERA

BACKGROUND OF THE INVENTION

1. Field of the Invention

This invention relates to a power supply circuit for a camera and more particularly to a power supply circuit which discontinues power supply to the electric circuit of the camera when the electromotive voltage of a power source has decreased.

2. Description of the Prior Art

Figure 1:
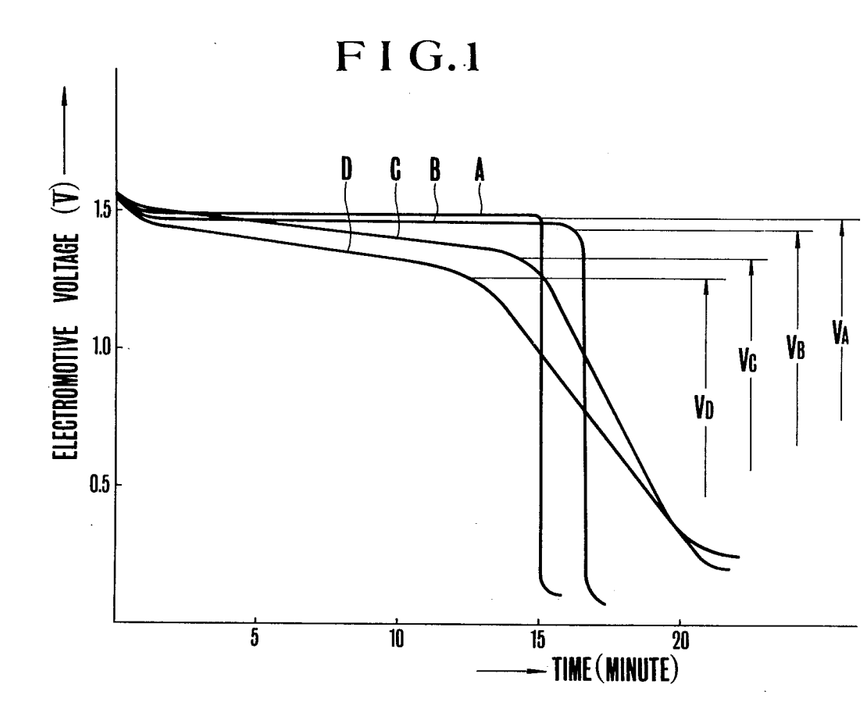
FIG. 1 illustrate, as examples, curves representing the discharge characteristics of various kinds of batteries used for cameras.

There has been known a power supply circuit which controls power supply to a control circuit of a camera with a detection output obtained by detecting the voltage of a power source, in such a manner as to prevent erroneous action when the voltage of the power soure is below a value required for the operation of the control circuit of the camera, the power supply circuit serving to inhibit power supply to the control circuit when the power source voltage drops below a preset voltage level. However, in such a conventional circuit, the on-off operation of a power supply switching element connected to the power source and the control circuit is directly controlled by the output of a detection circuit which detects the power source voltage. Therefore, the power supply switching element is controlled by the output of the detection circuit which is produced the instant the power source voltage is impressed upon the detection circuit. Thus, battery check is performed and the power supply switching element is controlled according to the current which flows through the detection circuit the instant the power source voltage is impressed upon the detection circuit. On the other hand, the current which flows through the detection circuit the instant the power source voltage is impressed upon the detection circuit presents an unstable current value until the stabilization of the action of the detection circuit. In the conventional power supply circuit, therefore, accurate battery check can not be performed and this has been presenting a problem. Further, in the conventional power supply circuit, a battery check is performed with a detection level set at a fixed value irrespective of the kind of the battery employed as power source. Therefore, it is impossible to make a battery check that is suitable for the voltage drop characteristic of the battery. Referring to FIG. 1 of the accompanying drawings, when continuous discharge is made under the same lead, the discharge characteristic of some of small dry element batteries comes to show a sharp drop of their electromotive force at the end of discharge as represented by curves A and B while that of others shows a comparatively gradual voltage drop which starts from the beginning as represented by curves C and D. The former type of batteries includes mercury batteries, etc. The latter type includes alkaline manganese batteries, etc. With such a small battery used as power source for a camera, the discharge current allowed to flow to an electrical circuit is comparatively small. The discharge is an intermittent discharge. However, when a voltage that makes the electrical circuit, etc. inoperative, namely an inhibiting voltage, is set at 1.4 V for example, such inhibiting voltage can be appropriate for the batteries of the characteristic represented by the curves A and B. However, the batteries of the characteristic represented by the curves C and D will remain still usable even after the inhibiting voltage. Therefore, in cases where batteries of the characteristic curves C and D are to be used, a lower voltage should be selected as inhibiting voltage. On the other hand, with the inhibiting voltage set at a value (1.3 V for example) that is suitable for the characteristic curves C and D, if a battery of the characteristic curve A or B is used, the circuit comes into an inoperative region as the discharge characteristic of the battery rapidly drops after the value. Then, this causes imperfect control actions and results in unreliable photographing. It is therefore necessary that the inhibiting voltage which is used as reference for a battery check is altered according to the kind of the battery employed. For example, it is appropriate to set inhibiting voltage values $V_A$, $V_B$, $V_C$ and $V_D$ for batteries of characteristic curves A, B, C and D as illustrated in FIG. 1. However, as mentioned in the foregoing, in the conventional circuit, the battery check is performed with a fixed inhibiting voltage irrespective of variation in the kind of batteries and thus there has been the above stated problem. In addition to this, in the conventional power supply circuit, a detection circuit is constantly allowed to operate and the power supply is effected by the output of the detection circuit. Therefore, a great amount of power is consumed for battery check. Besides, when the power source voltage becomes lower than the inhibiting voltage during an exposure control action, the power supply then stops in the middle of the control operation. In such a case, the shutter might be kept open. Such has been another problem with the conventional power supply circuit.

SUMMARY OF THE INVENTION

It is an object of this invention to provide a power supply circuit for a camera which controls power supply to a control circuit of the camera by means of an output of a detection circuit obtained after stabilization of a current flowing to the detection circuit during a power source voltage checking action.

It is another object of this invention to provide a power supply circuit for a camera which performs a battery check suitable for the discharge characteristic of a battery employed and which controls power supply to a control circuit of the camera by the output of the battery check.

It is a further object of this invention to provide a power supply circuit for a camera which controls power supply to the circuit of the camera according to a result of a battery checking action and which allows the battery checking action only for a very brief period of time and stores the result of the checking action to effect the control of power supply according to the stored value.

The above and other objects, features and advantages of the present invention will become more apparent from the following description of some embodiments thereof taken in conjunction with the accompanying drawings.

DESCRIPTION OF PREFERRED EMBODIMENTS

Figure 2:
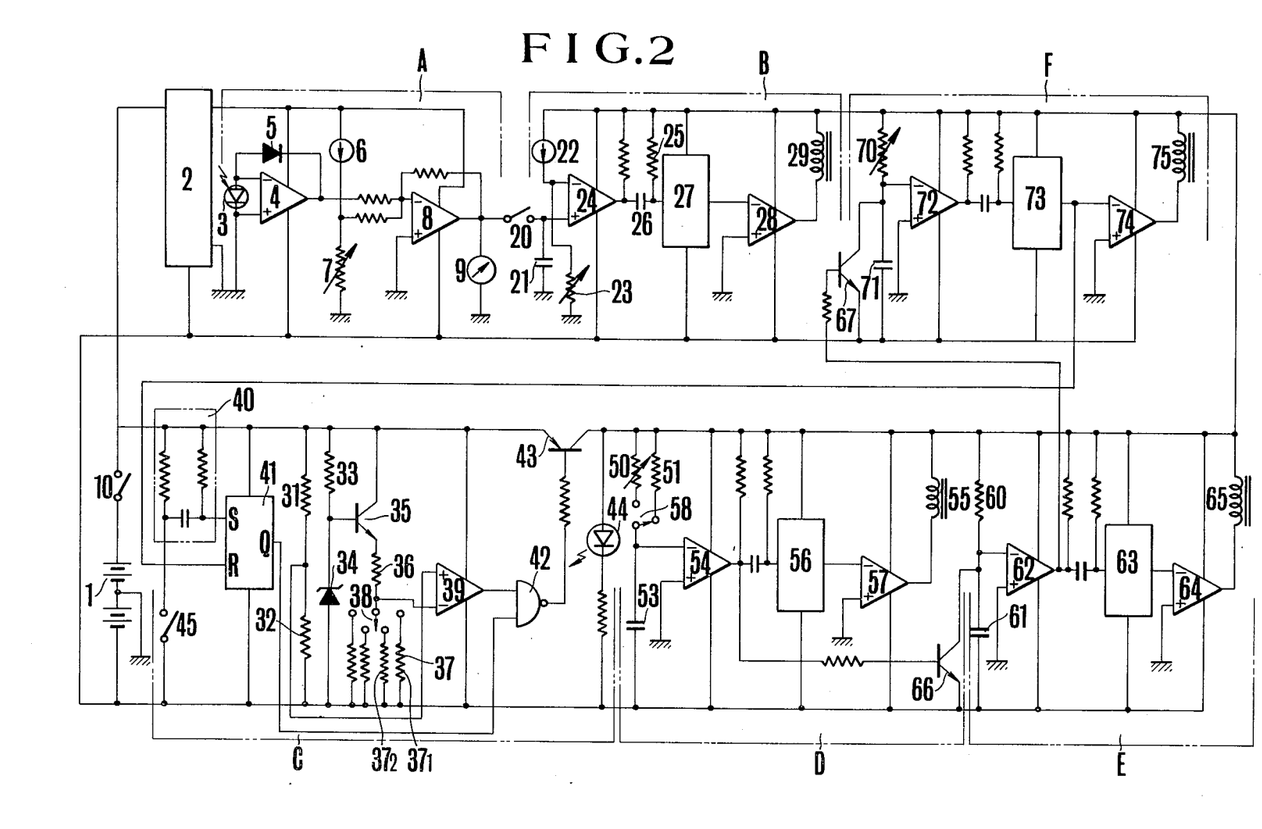
FIG. 2 is a circuit diagram illustrating an embodiment of the invented power supply circuit as applied to a shutter preference type AE single lens reflex camera.

The details of the power supply circuit of the present invention is described as follows: In FIG. 2 which illustrates an embodiment example of the invented power supply circuit as applied to a control circuit arrangement of a camera, a reference symbol A indicates a photometric circuit; B indicates a stop control circuit; C indicates a power supply and battery checker circuit; D indicates a first clamping control circuit; E indicates a shutter front diaphragm control circuit; and F indicates a shutter rear diaphragm control circuit. A reference numeral 1 indicates a power source battery; 2 indicates a constant voltage circuit; and 10 indicates a main switch which is brought into a closed state by the first stroke of a shutter button.

The photometric circuit A comprises a photogalvanic element 3 such as a silicon photocell; an operational amplifier which is provided with a diode 5 in its feedback loop for logarithmic amplification of the output signal; a variable resistance 7 which combines film sensitivity information, shutter time information and F value correction information required for correcting a flash error that arises where a photographing lens of a large aperture is employed; and an information introducing circuit consisting of a constant current source 6 and an operational amplifier. The photometric circuit accomplishes Apex operation to obtain a required stop value. The output value of stop thus obtained may be displayed inside a view finder, for example, by means of a display meter 9.

The stop control circuit B comprises a storage switch; a capacitor 21 which stores the output of the photometric circuit A through the switch 20; a constant current source 22; a variable resistance 23 which varies its resistance value in response to an unillustrated stop adjustment member; a comparison circuit 24; a resistance 25 which forms a differentiation circuit for differentiating the output of the comparison circuit 24 in response thereto; a capacitor 26; a monostable multivibrator 27 which operates in response to the pulse output of the differentiation circuit; an operational amplifier 28 which is connected to the output terminal of the multivibrator 27; and a stop controlling magnet 29.

The power supply circuit C comprises a differentiation circuit 40 which is composed of a resistance and a capacitor; a switch 45 which is brought into a closed state by a second stroke of the shutter button; a flip-flop circuit 41; a resistance 33; a constant voltage circuit which is composed of a Zener diode 34 and a transistor 35; and a group of reference voltage setting resistances 37 which are provided for selection and setting to be effected through a comparison circuit 39 and a switch 38. The electromotive voltage of a power source battery 1 is compared with the reference voltage by the comparison circuit 39. The output of the comparison circuit 39 and that of the flip-flop circuit are supplied to a NAND circuit 42. A power supply controlling transistor 43 is controlled by the output of the NAND circuit 42 to open or close the transistor. A reference numeral 44 indicates a light emitting diode for displaying the condition of the battery. In this circuit, when the voltage of the power source battery 1 is below the reference value, the output of the comparison circuit 39 becomes a low level potential (hereinafter will be called "logical 0"). Then, the transistor 43 is held in a cut-off state in order that the output of the NAND circuit 42 is made to be a high level potential (hereinafter will be called "logical 1"). After this, power supply will no longer be made to each of the control circuits D, E, F and B.

The first clamping control circuit D comprises a timer circuit consisting of a time constant circuit which is composed of a resistance 51, a capacitor 53 and a circuit 54 which detects the charge voltage of the capacitor 53; a monostable multivibrator 56 which allows a current to flow only for a preset length of time to a coil 55 of a magnet which is responsive to a time-up output signal of the timer circuit to release the first clamping provided for a mirror lifting action and for driving a stop control mechanism; and an operational amplifier 57. A reference numeral 50 indicates a variable resistance which is provided for a self-timer and is interlocked with an unillustrated self-timer time setting member. A self-timer operation mode can be selected by means of a switch 58.

The shutter front diaphragm control circuit E comprises a resistance 60, capacitor 61, a comparison circuit 62, a monostable multivibrator 63 and an operational amplifier 64 which are similar to those of the first clamping circuit described in the foregoing. The shutter front diaphragm control circuit does not operate until receipt of the output signal from the comparison circuit 54 of the first clamping circuit by a transistor 66. The resistance 60 is used for time adjustment in such a way as to prevent the front diaphragm of the shutter from travelling until an unillustrated mirror moves upward and until completion of the lens stop control.

The shutter rear diaphragm control circuit F comprises a transistor 67 for a count switch which is turned off by the output of the comparison circuit 62 of the shutter front diaphragm control circuit E; a variable resistance 70 which serves to set shutter time information by changing its resistance value in response to an unillustrated shutter dial; a capacitor 71 which forms a time constant circuit in combination with the variable resistance 70; a comparison circuit 72; a monostable multivibrator 73; an operational amplifier 74; and a shutter front diaphragm holding magnet 75 which is connected to the output terminal of the operational amplifier 74. The outut terminal of the monostable multivibrator 73 is connected to a reset terminal R of the above stated flip-flop circuit 41 to effect reset by the output of the multivibrator 73.

Figure 3:
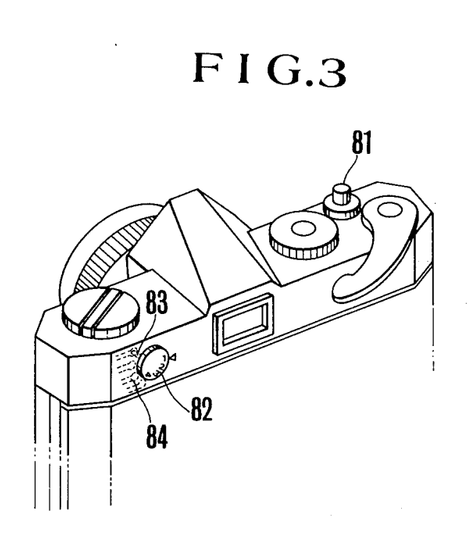
FIG. 3 is an oblique view illustrating, as an example, the arrangement of an inhibiting voltage selection member shown in FIG. 2.

In FIG. 3 which is an oblique view illustrating an example of arrangement of a power supply selection switch 38 in the invented power supply circuit, the selection switch 38 is operated by rotating a knob 82 disposed in the upper part of a camera cover. In this drawing, dotted lines 84 indicate terminals of a group of resistances 37 disposed inside the camera as shown in FIG. 2. A terminal 83 which is interlocked with the above stated knob 82 come into contact with one of the terminals 38 to effect selection. A reference numeral 81 indicates a shutter button. The power supply circuit of this invention operates as described below:

Assuming that a power source battery used for the camera is a mercury dry cell of a discharge characteristic represented by a curve A in FIG. 1, a battery check can be efficiently accomplished with an inhibiting voltage set at $V_A$. Then, with the inhibiting voltage set at $V_A$, when the power source voltage becomes $V_A$, the potential of a positive input terminal of the comparison circuit 39 becomes $$\frac{V_A \times R32}{R31 + R32}$$

This potential is compared with the potential of a negative input terminal of the comparison circuit 39. If arrangement is made to make the positive input terminal potential and the negative input terminal potential then coincide with each other, the comparison circuit 39 is inverted when the power source voltage becomes $V_A$. Therefore, the resistance value R37 to be selected out of the group of resistances 37 by the switch 38 will be obtained from an equation $$\frac{V_A R32}{R31 + R32} = \frac{V_E R37}{R36 + R37} \quad (1)$$

as follows:

$$R37 = \frac{V_A R32 R36}{V_E(R31 + R32) - V_A R32} \quad (1)$$

wherein $V_E$ represents the emitter voltage of the transmitter 35 which is, as mentioned in the foregoing, the output of a constant voltage circuit. Therefore, $V_E$ is constant, R31, R32 and R36 respectively represent the resistance values of the resistances 31, 32 and 36. When the resistance value of a resistance $37_1$ is set to be R37, the battery check can be accomplished with $V_A$ set to be an inhibiting voltage. In this case, the switch 38 is operated to select the resistance $37_1$. When the shutter button 81 is depressed under this condition, the power source switch is turned on by the first stroke of the shutter button 81 to impress the power source voltage on the circuit C. If the power source voltage $V_A$ is high, the potential of the positive input terminal of the comparison circuit 39 is higher than the potential of the negative input terminal and, therefore, the output of the comparison circuit 39 is logical "1." When the shutter button is further depressed, the switch 45 is closed by the second stroke of the shutter button to actuate the differentiation circuit 40 and a pulse signal is produced. The signal is supplied to the flip-flop circuit 41 to set the circuit 41, the output Q of the flip-flop circuit becomes logical "1." On the other hand, if the electromotive force of the power source battery 1 is more than $V_A$ volts, both of the two inputs to the NAND 42 become logical "1" as the output of the comparison circuit 39 is also logical "1." The output of the NAND 42 is inverted to logical "0." By this, the base potential of the transistor 43 becomes "0" and the transistor is turned on. Then, by this, the power is supplied from the power supply circuit C to the shutter front diaphragm control circuit E, shutter rear diaphragm control circuit F and the stop control circuit B. Then, the light emitting diode 44 is lighted to indicate that each control circuit is in an operative state. In other words, when the transistor 43 is turned on, the comparison circuit 54 produces an output after a length of time determined by the time constant circuit which is composed of the resistance 51 and the capacitor 53. The differentiation circuit is actuated by this to bring the monostable multivibrator 56 into an operative state. Then, a current flows to the magnet 55 for a length of time determined by the multivibrator. This causes the first clamp to operate to bring about the mirror lifting action and the operation of the control mechanism. The switch 20 is then turned off by this and the output of the photometric circuit A is stored in the capacitor 21 which has been in an operative state since when the switch 10 was turned on. The resistance value of the variable resistance 23 changes according to the movement of a stop adjustment member brought about with the stop control mechanism being driven. When the value stored in the capacitor 21 comes to coincide with the resistance value of the variable resistance 23 corresponding to the stop value adjusted by the stop adjustment member, the comparison circuit generates an output to actuate the monostable multivibrator 27 and thus to supply a current to the magnet 29 for a preset period of time. Then, the stop adjusting action by the stop control mechanism is stopped by a member which is interlocked with the magnet. Further, at the time when an output is generated by the above stated comparison circuit 54, the transistor 66 is turned off and the time constant circuit consisting of the resistance 60 and the capacitor 61 is made operative. Thus the time constant of the time constant circuit becomes a value corresponding to the length of time required for completion of the mirror lifting action and the control action by the stop control mechanism. When these actions are completed, the comparison circuit 62 generates an output to actuate the monostable multivibrator to supply a current to the magnet 65 for a preset length of time. By this, the clamping arrangement for holding an unillustrated shutter front diaphragm is released to allow the shutter front diaphragm to travel and an exposure operation begins. When the output of the comparison circuit 62 is generated, the transistor 67 is turned off to actuate the shutter time control time constant circuit which consists of the resistance 70 and the capacitor 71. The time constant circuit then allows the monostable multivibrator to operate after a fixed length of time set at the resistance 70. Then, after a preset length of time, a current is supplied to the shutter rear diaphragm holding magnet 75 to allow the shutter rear diaphragm to travel and the exposure operation is completed. The output of the monostable multivibrator 73 is then transmitted to the reset input terminal R of the flip-flop circuit 41 to reset the flip-flop circuit. The output of the NAND gate circuit 46 is changed to a logical value "1" by this. The transistor 43 is turned off to stop power supply to each circuit and to complete the photographing operation.

When the electromotive force of the power source battery decreases and its voltage becomes lower than the inhibiting voltage $V_A$, the output of the comparison circuit is held at a logical value "0." Therefore, the output of the NAND 42 becomes the logical value "1" without being inverted. The transistor 43 is kept in an off state by this and there takes place no power supply to each control circuit through the transistor 43, so that the shutter can be prevented from making an erroneous action. The light emitting diode 44 is not lighted thus giving a warning that the shutter is in an inoperative state.

Further, when an alkaline manganese battery of a discharge characteristic as represented by the curve C of FIG. 1 is employed as the power source battery 1, the knob 82 shown in FIG. 3 is operated to shift the position of the selection switch 38 to a resistance $37_2$ which, among the group of the resistances 37, possesses a resistance value R'. Then when the electromotive voltage of the power supply voltage 1 becomes lower than a voltage value $V_C$, each control part becomes inoperative in the same manner as described in the foregoing. In this case, the voltage value $V_A$ as used in the formula (1) is replaced with $V_C$ for the resistance value R'. As mentioned in the foregoing, the flip-flop circuit 41 is held in a set state during a period from the second depression stroke of the shutter release button to the time when the shutter rear diaphragm begins to travel. Therefore, in the exposure control action, the release button does not have to be kept strongly depressed. Even if the release button returns to the position of the first stroke, the flip-flop circuit 41 is kept in a set state. Thus, the continuity status of the transistor 43 is controlled only by the result of a power source voltage check. The power supply, therefore, is not stopped even when the release button is returned to the first stroke position, so that the exposure control action can be accurately accomplished. Also, after the battery check, the flip-flop circuit is set by the second stroke of the release button and the output of the flip-flop circuit is impressed upon the NAND gate circuit 42. Then, the output of the NAND gate circuit representing the result of the battery check is impressed upon the power supply transistor. Therefore, after the power source switch is closed, the power supply transistor is not controlled by the output of the battery check until the current which flows to the circuit for battery check action is stabilized. The NAND gate output resulting from the battery check is impressed upon the power supply transistor only after the stabilization of the battery checking current. This ensures an accurate battery check.

Figure 4:
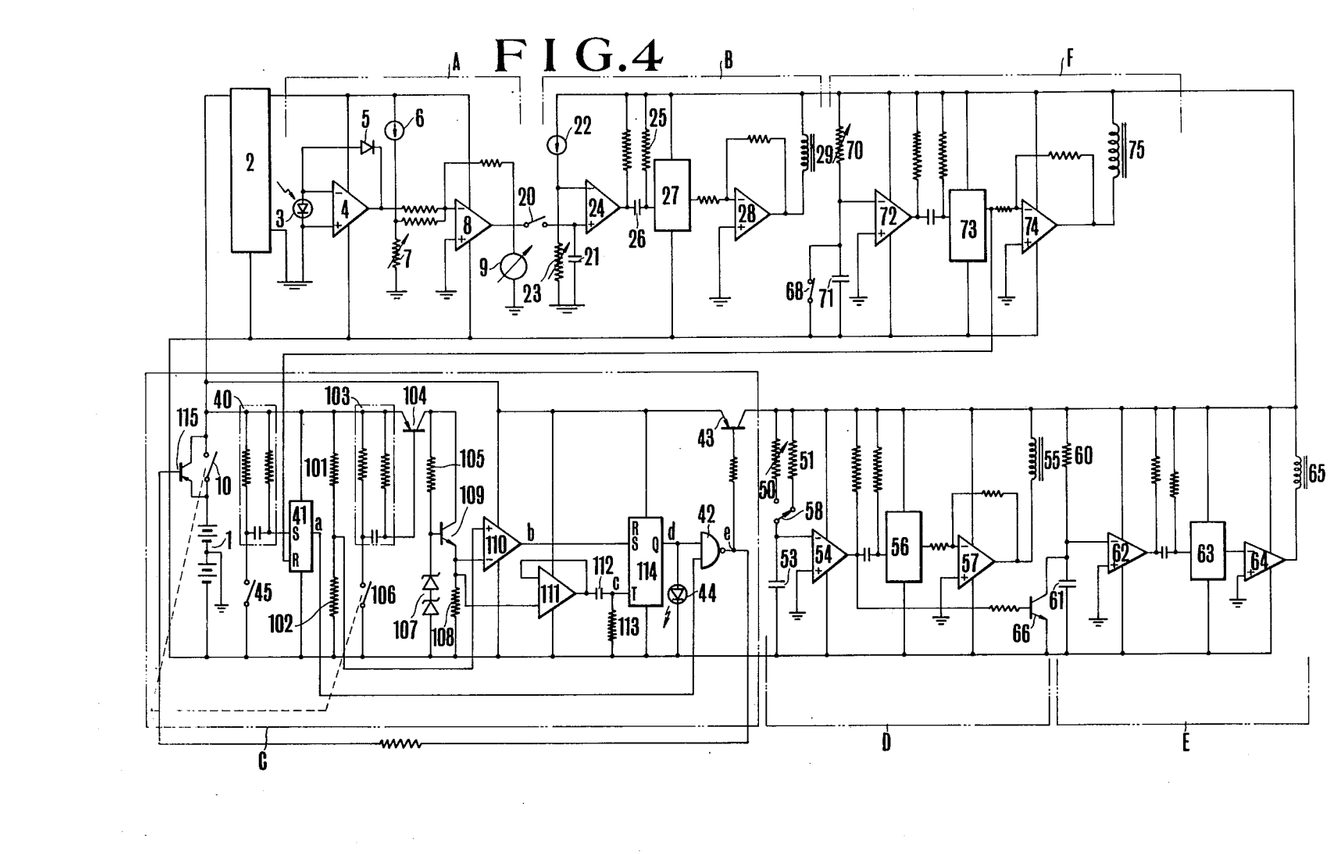
FIG. 4 is a circuit diagram illustrating another embodiment of the invented power supply circuit.

In another embodiment of the invented power supply circuit illustrated in FIG. 4, an erroneous battery check action due to variation of the electromotive voltage of a power source resulting from variation in a load current flowing through the electric circuit of a camera is prevented. Referring to FIG. 4, circuits A, B, D, E and F are identical with the corresponding circuits used in the embodiment illustrated in FIG. 2. A circuit C comprises a power source 1; a differentiation circuit 40 which is composed of a resistance and a capacitor; a switch 45 which is brought into a closed state by the second stroke of a shutter button; a flip-flop circuit 41 which is set by a pulse produced by the differentiation circuit 40; resistances 101 and 102 which constitute a voltage dividing resistance; a switch 106 which is interlocked with a main switch 10; a differentiation circuit 103 which produces a pulse when the switch 106 is turned on; a transistor 104 which is turned on by the pulse of the differentiation circuit; a constant voltage circuit which is composed of resistances 105 and 108, a Zener diode 107 and a transistor 109, the constant voltage circuit being arranged to produce an output of a level which is a little higher than a voltage level required for the operation of the circuit; a comparison circuit 110 the input terminals of which are respectively connected to the connection point of voltage dividing resistance and the output terminal of the constant voltage circuit; an operational amplifier 111 provided for impedance transformation; a capacitor 112 and a resistance 113 which form a differentiation circuit; a RST flip-flop circuit 114 to which a T input terminal of the differentiation circuit is connected and the set input terminal S of which is connected to the output terminal of the comparison circuit; a light emitting diode 44 which is connected to the output terminal of the flip-flop circuit 114; a NAND gate circuit 42 which is connected to the output terminal of the flip-flop circuit 114 and to that of the flip-flop circuit 41; a power supply transistor 43 which is connected to the gate circuit 42; and a transistor 115. A bias voltage is impressed upon the flip-flop circuit 114 and the flip-flop circuit is brought back into a reset state when it becomes operative.

Figure 5A:
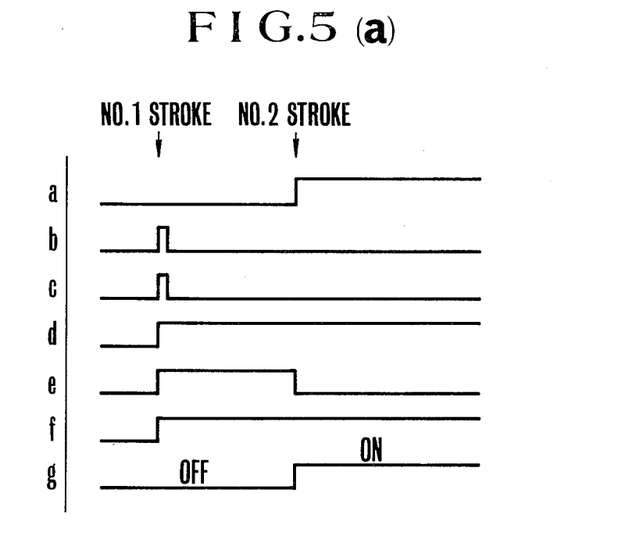
FIGS. 5(a) and (b) are wave form charts illustrating the operation of the embodiment illustrated in FIG. 4.
Figure 5B:
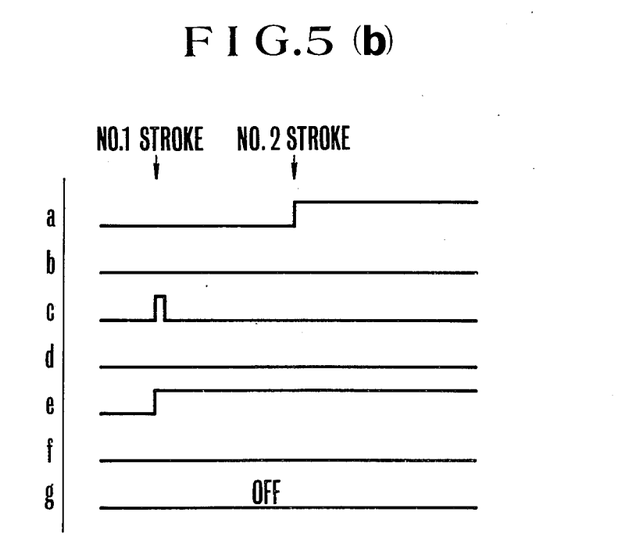

Referring also to FIG. 5(a) and (b) which show waveform charts, the embodiment illustrated in FIG. 4 operates in the following manner: First let us assume that the voltage of the power source 1 is sufficiently high. When the shutter button is depressed, the switch 10 and the switch 106 which is interlocked with the switch 10 are turned on by the first stroke of the shutter button. This actuates the constant voltage circuit 2. The photometric circuit is also brought into an operative state. The meter 9 comes to show a stop value which will result in correct exposure according to the brightness of a photographing object. With the switch 106 turned on, this causes the differentiation circuit to produce a pulse. Then, a negative pulse is impressed upon the base of the transistor 104, which is momentarily turned on while the negative pulse is being impressed thereon. By this, the transistor 109 which forms a constant voltage circuit is turned on to produce a constant voltage. At this time, a current which flows through the transistor 109 and a current which flows to the photometric circuit are arranged to be the same as the maximum bed current of the circuit, such arrangement being made beforehand by properly setting each circuit constituent element, such as the resistance 108, etc. Then, the electromotive voltage of the power source 1 represents a value obtained under a condition of a maximum load current flow. By this, the output of the voltage dividing resistance 101 and 102 is made to be corresponding to the electromotive voltage of the power source 1 under the condition of having had the maximum load current flow. The output of the voltage dividing resistance is then compared by the comparison circuit 110 with a constant voltage produced by the constant voltage circuit. With the voltage of the power source 1 sufficiently high as mentioned in the foregoing, the comparison circuit 110 produces an output as represented by "b" in FIG. 5(a). The output is supplied to the set input terminal of the RST flip-flop circuit 114. Meanwhile, the output of the constant voltage circuit is supplied to the capacitor 112 and resistance 113 which form a differentiation circuit, and the pulse as represented by "c" in FIG. 5(a) is also supplied to the T input terminal of the flip-flop circuit 114. Also, as mentioned in the foregoing the output of the comparison circuit 110 is supplied to the set input terminal of the flip-flop circuit. Therefore, the output of the flip-flop circuit 114 becomes a logical value "1" as represented by "d" in FIG. 5(a). This causes the light emitting diode 44 to be lighted up to indicate that the battery has a sufficient capacity.

Further, since the transistor 104 is turned on only for a length of time of the width of the pulse produced by the differentiation circuit 103 as described in the foregoing, the battery checking action is performed only for a very brief period of time. After that, the transistor 104 is turned off so that the power is not wasted for the battery check. Upon completion of the battery check, the switch 45 is turned on by the second stroke of the shutter release button. The pulse from the differentiation circuit 40 is then applied to the flip-flop circuit 41 to bring it into a set state as represented by "a" in FIG. 5(a). With the flip-flop circuit 41 having been brought into the set state, its output is supplied to one of the input terminals of the NAND gate circuit 42. Since the output of the flip-flop circuit 114 has been supplied to the other input terminal of the NAND gate circuit at this time as stated in the foregoing, the output of the NAND gate circuit becomes a logical value "0" as represented by "e" in FIG. 5(a). By this, the power supply transistor 43 is turned on as represented by "f" in FIG. 5(a). The output of the NAND gate circuit 42 is then supplied to the base of the transistor 115 to turn it on. This causes the transistors 115 and 43 to be held in their on states even when the switch 10 is turned off. Therefore each circuit is held in a state of being supplied with the power to carry out a sequence control for photographing. In other words, with the transistor 43 turned on, the comparison circuit 54 produces an output after a length of time determined by the time constant circuit which is formed by the resistance 51 and the capacitor 53. The differentiation circuit is activated by this. Then, the monostable multivibrator is activated in turn to cause a current to flow to the magnet 55 only for a length of time determined by the monostable multivibrator 56. This causes the first clamp to operate for the mirror lifting action and the operation of the stop control mechanism. By this, the switch 20 is turned on and the output of the photometric circuit A is stored in the capacitor 21. With the stop control mechanism operated, the resistance value of the variable resistance 23 changes according as the stop adjustment member is operated. When the resistance value of the variable resistance corresponding to a stop value adjusted by the stop adjustment member has come to coincide with the value stored in the capacitor 21, the comparison circuit 24 produces an output to actuate the monostable multivibrator 27. Then, a current is supplied to the magnet 29 for a preset length of time to discontinue the stop adjusting action being performed by the stop control mechanism. At the time when the output is produced by the comparison circuit 54, the transistor 66 has been turned off and the time constant circuit consisting of the resistance 60 and the capacitor 61 is in operation; and the time constant then has become a value corresponding to a length of time required for completion of the mirror lifting action and the operation of the stop control mechanism. With all actions having been completed as stated in the foregoing, the comparison circuit 62 produces an output to activate the monostable multivibrator 63. Then a current is supplied to the magnet 65 for a preset length of time to release the shutter front diaphragm holding clamp to allow the shutter front diaphragm to travel to start exposure thereby. With the shutter front diaphragm travelling, the switch 68 is turned off to actuate the shutter time control time constant circuit which is formed by the resistance 70 and the capacitor 71. This in turn actuates the monstable multivibrator 73 after a period of time corresponding to the shutter time set beforehand at the resistance 70. By this, a current is supplied to a shutter rear diaphragm holding magnet 75 to allow the shutter rear diaphragm to travel and the exposure is completed thereby. Then, the output of the monostable multivibrator 73 is applied to the reset input terminal R of the flip-flop circuit 41 to reset it. The output of the NAND gate circuit 42 then becomes a logical value "1" to turn off the transistors 115 and 43 and the power supply to each circuit discontinues to complete the photographing operation.

When the electromotive voltage of the power source 1 is lower than a value required for driving each circuit, the embodiment operates as described below:

The switches 10 and 106 are turned on by the shutter release button. The transistor 104 is turned on only for a momentary period of time. In this manner, the operation is completely the same as in the case of sufficiently high electromotive voltage of the power source 1 until a battery check is made. However, as represented by "b" in FIG. 5(b), the comparison circuit 110 does not produce a logical value "1" because of the low electromotive voltage of the power source and, as represented by "f" in FIG. 5(b), the light emitting diode is not lighted up. Also, as represented by "e" in FIG. 5(b), the NAND gate circuit produces a logical value "1" and, by this, the transistors 43 and 115 are kept in an off state as represented by "g" in FIG. 5(b). Thus, there takes place no power supply to each circuit and no photographing action is performed. As described in the foregoing, in this embodiment, the result of a battery check is transmitted to the power supply transistor when the battery checking current has been stabilized after the power source switch is turned on in the same manner as in the case of the embodiment illustrated in FIG. 2. Furthermore, since the flip-flop circuit 41 is set, the shutter release button does not have to be kept depressed after the battery check. In this embodiment, a battery check is performed for a preset period of time; the results of the battery check is stored in the flip-flop circuit 114; and the power supply transistor 43 is controlled according to the value stored. As long as the power source voltage found by the battery check is higher than a preset value, the power supply can be made continuously irrespective of variation in the electromotive voltage of the power source. Namely, in accordance with this embodiment, a battery check is accomplished, in a momentary period of time, with a maximum load current (for operation of control circuits) allowed to flow for the battery check; and the result of the check is stored in the flip-flop circuit. This method permits an accurate battery check. Further, since the power supply transistor is turned on by the output of the flip-flop circuit which has been set according to the result of the battery check, the power supply transistor is kept in an on state until completion of photographing. Therefore, even when the voltage becomes a value lower than a battery check level during a photographing operation, the photographing operation can be carried out until completion of photographing. Besides, since the battery check level is set a little higher than a voltage level required for operation of circuits, circuits are prevented from becoming inoperative during a photographing operation. Thus, the camera never stops its operation during the photographing process so that the control actions can be automatically performed until completion of photographing and then camera is brought back into its initial state. The main features of this embodiment include that the battery check is performed only for a very brief period of time; and since the result of the battery check is stored to control the power supply in accordance with the stored value, the electric current is not wasted for battery checking during a photographing operation so that power consumption can be reduced to a great degree.

Figure 6:
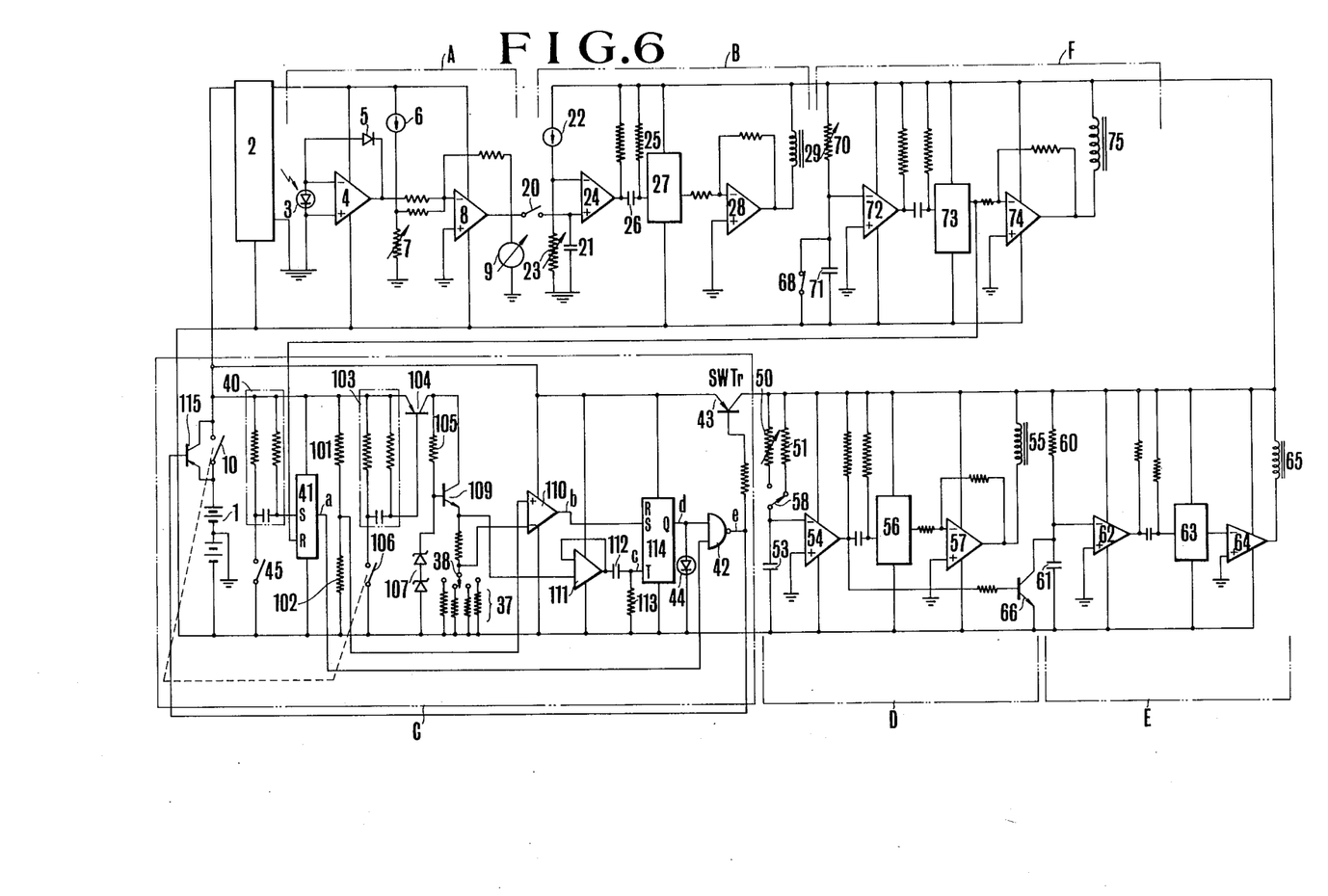
FIG. 6 is a circuit diagram illustrating still another embodiment of the invented power supply circuit.

FIG. 6 is a circuit diagram illustrating still another embodiment of the invented power supply circuit. The embodiment has a circuitry possessing the functions of both of the embodiments illustrated in FIGS. 2 and 4.

Each circuit is arranged in the same manner as in FIGS. 2 and 4. Therefore, in FIG. 6, like circuit elements are indicated by like reference symbols and numerals. Since the embodiment illustrated in FIG. 6 operates almost in the same manner as those illustrated in FIGS. 2 and 4, the details of the operation is omitted here. However, in this embodiment, the switch 38 is first operated to select one of the group of resistances 37 according to the characteristic of the power source battery employed in the same manner as in the case of the embodiment illustrated in FIG. 2. Following this, the release button is operated and control actions are performed in the same manner as in the case of the embodiment illustrated in FIG. 4. The power supply is made through a battery check operation which is made in consideration of the characteristic of the power source in the same manner as described in detail for the embodiment illustrated in FIG. 4.

Figure 7:
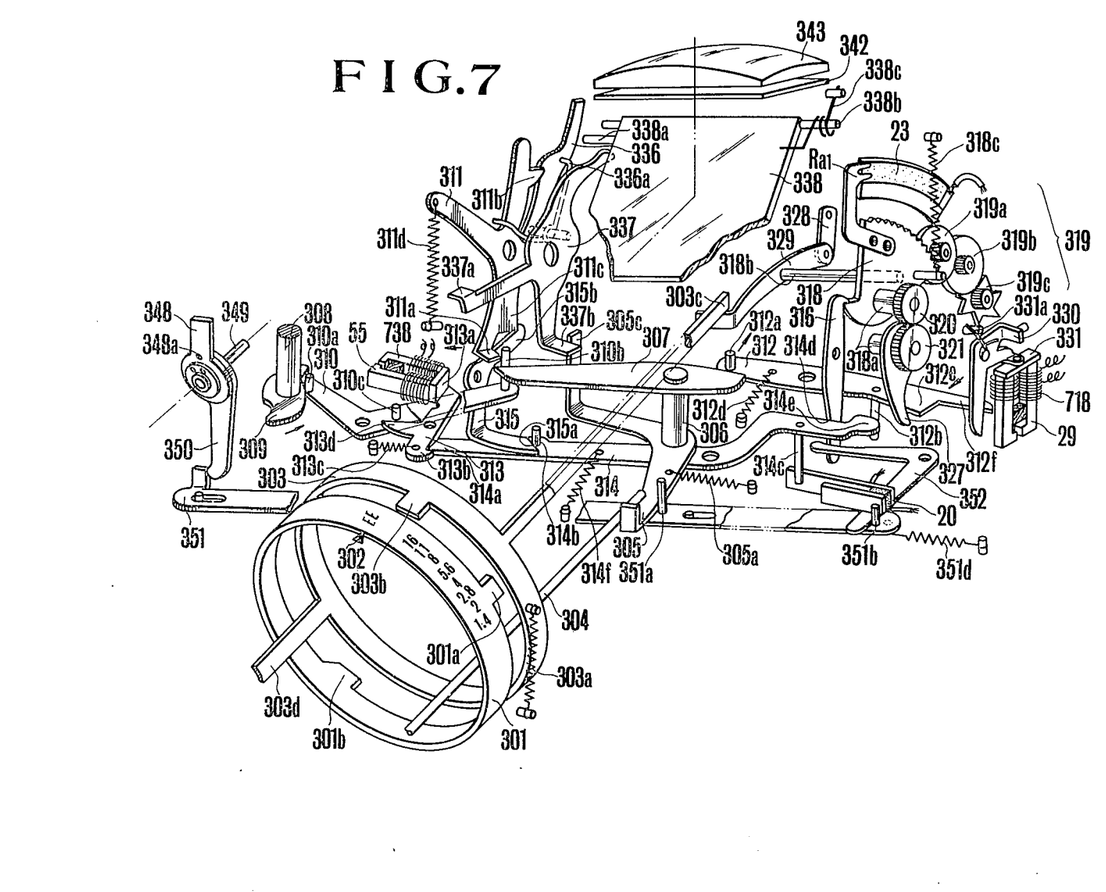
FIG. 7 illustrates the construction of a camera which is used in combination with the electric circuit illustrated in FIG. 2, FIG. 4 or FIG. 6.

FIG. 7 illustrates a mechanism which forms a camera in combination with the circuits illustrated in FIGS. 2, 4, and 6. In FIG. 7, the camera mechanism is illustrated as in a state of having completed a film winding and shutter charging operation. A reference numeral 301 indicates a stop ring, which is provided with an automatic stop index EE; manual stop indexes; a protrusion 301a; and a cam portion 301b. A reference numeral 302 indicates an index provided for adjusting the automatic stop index EE to the manual stop indexes; 303 indicates a stop preset ring which is urged by a spring 303 to rotate clockwise and is provided with a protrusion 303b for engagement with the protrusion 301a of the stop ring 301. The stop preset ring 303 is also provided with an arm 303c and a lever 303d, which determines the rotation of a bell crank through an unillustrated stop setting cam ring. The bell crank is provided for defining a stop aperture by restricting the rotation of an unillustrated stop driving ring. A reference numeral 304 is a pin provided on the stop driving ring. The end of the pin 304 is engaging with an automatic stop lever 305 which is urged by a spring 305a to rotate counterclockwise. The automatic stop lever 305 has an uprising portion 305c while an intermediate lever 307 is rotatably fitted on the shaft 306 of the automatic stop lever 305. A reference numeral 308 indicates a wind-up shaft of an unillustrated wind-up lever. A wind-up cam 309 is secured to an end face of the wind-up shaft 308. A reference numeral 310 is a rotatable intermediate lever. A pin 310a provided at one end of the intermediate lever 310 engages with the wind-up cam 309. A pin 310b which is provided at another end of the intermediate lever 310 engages with one end of the above stated intermediate lever 307 and also with one end 311a of a mirror driving lever 311. A first clamp lever 313 is charged by a pin 310c provided on the intermediate lever 310. The other end of the intermediate lever 307 is engageable with a pin 312a provided at one end of a rotatable charge lever 312. The charge lever 312 is urged by a spring 312d to rotate counter-clockwise. A first clamping permanent magnet 55 engages with one end 313a of the first clamp lever 313. The other end 313b of the first clamping lever 313 engages with one end 314a of a release lever 314 with a spring 313c connected to the end 313b. With the intermediate lever 310 rotating, the pin 310c provided on the lever engages with a cam face 313d of one end of the first clamp lever 313. At one end of the release lever 314, there is provided a pin 314b which engages with one end 315a of a mirror drive engagement lever 315 while another end 315b of the lever 315 engages with one side 311c of the mirror drive lever 311. One end of a rotatable EE lock lever 316 engages with ends 314d and 314e of the release lever 314 while a pin 312b provided on the charge lever 312 also engages therewith. A pin 314c is provided at the other end of the release lever 314 and a moving contact of a memory holding switch 20 is engaging with the pin 314c. The release lever 314 is urged by a spring 314f to rotate counter-clockwise. A reference numeral 318 indicates an EE sector gear which engages with the other end of the lock lever 316. Gears 319a and 319b and a stop wheel 319c which form a speed governing mechanism 319 are engaged with the sector gear 318. A sliding piece $Ra_1$ of a variable resistance 23 which determins a preset stop value is attached to the sector gear 318. A gear 320 is attached to a shaft 318a of the sector gear. An EE charge gear 321 engages with the gear 320. A lever 327 is coaxially secured to the gear 321 and is disposed to be in contact with the other end part 312e of the charge lever 312. A pin 318b is provided on the sector gear 318. The end face of the pin 318b is secured to a signal lever 329 which is rotatably attached to a supporting lever 328. The bent end of the signal lever 329 is blocking the arm 303c of the stop preset ring 303. The EE sector gear 318 is strongly urged by a spring 303a to rotate clockwise against the force of a spring 318c which is disposed over the sector gear 318 to urge it to rotate counter-clockwise. A reference 29 indicates a magnet which is provided with a permanent magnet for stop control. The magnet 29 is capable of attracting an iron piece 331 which is attached to an attraction lever 330. The attraction lever is urged by a spring 331a to rotate counter-clockwise. A bent end portion of the attraction lever 330 is engageable with the stop wheel 319c. Further, a branched end portion 312f of the charge lever 312 is in contact with the other end of the attraction lever 330. The above stated mirror drive lever 311 is provided with an unillustrated delay device and is urged by a spring 311a to rotate counter-clockwise. Meanwhile, one end of the mirror drive lever 311 engages with the other side of the mirror drive engagement lever 315. A mirror clamp lever 336 engages the clamping part 311b of the mirror drive lever 311. The mirror clamp lever 336 is urged to rotate counter-clockwise by a spring 336a which is bridged between the lever 336 and the mirror drive lever 311. One end of the mirror clamp lever 336 engages with a lifting lever 337 one end of which is coaxially held with the mirror drive lever 311. Another end 337a of the lifting lever 337 is arranged to be rotated clockwise by an unillustrated external means for lifting the mirror in such a manner that the mirror can be lifted up individually. The mirror 338 is provided with a spring-up pin 338a which engages with another end of the lifting lever 337. The mirror 338 is rotatable on its shaft 338b. A reference numeral 338c indicates a mirror returning spring, and 348 indicates a stop-down self lever having an index 348a provided thereon. When the lever 348 rotates clockwise on a shaft 349, a stop-down link lever 351 is moved to the left through a lever 350. There are provided pins 351a and 351b on the lever 351. The pin 351a engages with the automatic stop lever 305 while the pin 351b engages with the EE lock lever 316 through a L-shaped lever 352. A spring 351d urges the stop-down link lever 351 to the right. Since the operation of the arrangement illustrated in FIG. 7 is not directly relative to this invention, the details of the operation are omitted here. However, in the process of operation of the embodiments illustrated in FIGS. 2, 4 and 6, the arrangement illustrated in FIG. 7 operates in the following manner: When the magnet 55 is activated, the spring 313c causes the first clamp lever 313 to rotate clockwise. The release lever 314 is freed and thus caused to rotate counter-clockwise by the spring 314f. The switch 20 is turned off by the pin 314c and the charged voltage of the capacitor 21 is stored and maintained. Then, the lock lever 316 disengages from the gear 318. The spring 303a causes the gear 318 to rotate through the arm 303c, lever 329 and pin 318b. By this, the resistance value of the variable resistance 23 is made to be a value corresponding to a stop value preset by the ring 303. This causes the comparison circuit to produce an output to actuate the magnet 29. Then, the spring 331 causes the lever 330 to rotate counter-clockwise. The rotation of the stop wheel 319c is stopped to determine the position of the sector gear 318 and thus a suitable stop value is determined by the stop preset ring 303. Concurrently with this, the mirror drive engagement lever 315 disengages from the mirror drive lever 311 when the lever 314 rotates. The spring 311d then causes the mirror drive lever 311 to rotate. This in turn causes the lifting lever 337 supporting the lever 336 to rotate the automatic stop lever 305 then rotates clockwise to actuate the pin 304 and the stop is stopped down. Further, the rotation of the lever 337 pushes the springing-up pin 338a upward to spring the mirror 338 upward. After the activation of the magnet 55, there take place a mirror lifting action and the stop control action as described in the foregoing for exposure control.

As described in details in the foregoing, in the power supply circuit of this invention, the power supply is controlled by the output of a detection circuit obtained after stabilization of the current which flows to the detection circuit at the time of a power source voltage check, the detection level is adjustable according to the characteristic of the power source employed; the detecting operation is accomplished in a very short period of time, and the result of detection is stored to perform power supply according to a value which is thus stored. In this manner, this invention provides a power supply circuit which is capable of performing power supply accurately and with a low rate of power consumption.

What is claimed is:

1. A power supply circuit for a camera comprising:
   (a) a power source;
   (b) voltage detection means which is connected to said power source for detecting the voltage of said power source and which develops a signal when the voltage of said power source is beyond a predetermined voltage value;
   (c) signal forming means which forms an output signal after a predetermined time after the power source voltage is detected by said voltage detection means;
   (d) an electrical circuit for controlling a photographing operation; and
   (e) a power supply circuit connected to the power source to form a power supply path to said electrical circuit in response to the signal produced by said voltage detection means and the signal produced by said signal forming means.

2. A power supply circuit according to claim 1 wherein said power supply circuit is provided with a first switching means which is arranged to connect said voltage detection means to said power source; and said signal forming means is arranged to produce a signal after the first switching means connects the voltage detection means to said power source.

3. A power supply circuit for a camera comprising:
   (a) a power source;
   (b) voltage detection means which produces a signal corresponding to the voltage of the power source;
   (c) a reference signal forming circuit which produces a reference signal corresponding to a preset reference voltage, the reference signal forming circuit being capable of producing a plurality of different reference signal values and being arranged to selectively produce a reference signal suitable for the characteristic of the power source employed for the camera;
   (d) a comparison circuit which compares an output signal of the voltage detection means with the reference signal and which produces a power supply inhibiting signal when the output signal of the voltage detection means is lower than the reference signal corresponding to the referenced voltage;
   (e) a control circuit for controlling a photographing operation; and
   (f) a power supply control circuit connected to the power source and to said control circuit to block a power supply path from the power source to the control circuit in response to said power supply inhibiting signal.

4. A power supply circuit according to claim 3, wherein said reference signal forming circuit includes a constant voltage circuit, which comprises a plurality of resistance means and switching-and-selecting means for selecting said resistance means; and said reference signal corresponding to a reference signal value is selectively produced out of said plurality of reference signal values by selecting the resistance means using said switching-and-selecting means.

5. A power supply circuit which controls the power supplied to an electrical circuit of a camera, the power supply circuit comprising:
   (a) a power source;
   (b) voltage detection means which is connected to said power source so as to detect a voltage of said power source and which develops a signal when the voltage of said power source is beyond a predetermined voltage value;
   (c) holding means which produces an output in response to the signal produced by said voltage detection means and which holds said output even after the signal disappears; and
   (d) power supply switching means connected between said power source and said electrical circuit of the camera, the output of said holding means causing the switching means to effect switching in such a way as to form a power supply path to the electrical circuit.

6. A power supply circuit according to claim 5, wherein said power supply circuit is provided with an output impressing means for impressing an output of the power source upon said voltage detection means for a preset period of time.

7. A power supply circuit according to claim 6 wherein said output impressing means comprises a switching means connected between said power source and said voltage detection means and an output producing means which produces an output for a preset period of time; and said switching means impresses an output of the power source upon the voltage detection means in response to an output of the output producing means.

8. A power supply circuit according to claim 5 wherein said voltage detection means is arranged in such a manner that, upon detection of the voltage, there flows to the voltage detection means a current which is about the same as a maximum load current flowing to said electrical circuit of the camera.

9. A power supply circuit according to claim 5, wherein there is provided a display means which displays a status of the power supply using the output of said holding means.

10. A power supply circuit which controls the power supplied to an electrical circuit of a camera, the power supply circuit comprising:
 (a) a power source;
 (b) voltage detection means connected to said power source to produce an output corresponding to a voltage of the power source;
 (c) reference voltage forming means which produces a preset reference voltage;
 (d) a comparison circuit which compares the output of said voltage detection means with said reference voltage and which produces a power supply signal when the output of the voltage detection means is higher than the reference voltage;
 (e) flip-flop means which produces a power supply control signal in response to the power supply signal produced by said comparison circuit; and
 (f) switching means for power supply which is connected between said power source and said electrical circuit of the camera and which forms a power supply path to said electrical circuit in response to the power supply control signal produced by said flip-flop means.

11. A power supply circuit for a camera comprising:
 (a) a power source;
 (b) voltage detection means for detecting a voltage of said power source and for developing a signal when the voltage of said power source is beyond a predetermined voltage;
 (c) switch means for connecting said power to said voltage detection means;
 (d) a control circuit for controlling a photographing operation;
 (e) a switching circuit responsive to said signal from said voltage detection means for supplying said voltage of the power source to said control circuit; and
 (f) switching means connected to said switch means in parallel, said switching means being responsive to said signal from said voltage detection means for connecting said power source to said switching circuit.

12. A power supply circuit for a camera comprising:
 (a) a power source;
 (b) voltage detection means which is connected to said power source so as to detect a voltage of said power source and which produces a signal when the voltage of said power source is beyond a predetermined voltage value;
 (c) a signal forming circuit which produces an output signal in response to said signal from said voltage detection means, said signal forming circuit being arranged to form said output signal after a predetermined period after detection of the voltage of said power source by said voltage detecting means;
 (d) an electrical circuit for controlling a photographing operation; and
 (e) a power supply means connected to said power source to form a power supply path to said electrical circuit in response to said output signal produced by said signal forming circuit.

* * * * *